United States Patent [19]

Powell et al.

[11] 3,974,065
[45] Aug. 10, 1976

[54] EARLY DETECTION AND WARNING METHOD FOR CONTROLLING TEMPERATURE EXCURSIONS IN HYDRO-PROCESSING HYDROCARBONS

[75] Inventors: Bruce E. Powell, Kensington; Bruce E. Stangeland, Berkeley, both of Calif.

[73] Assignee: Chevron Research Company, San Francisco, Calif.

[22] Filed: Dec. 31, 1974

[21] Appl. No.: 537,738

[52] U.S. Cl. .................. 208/213; 208/59; 208/143; 208/216; 208/254 H
[51] Int. Cl.² ............. C10G 13/00; C10G 23/02; C10G 23/10
[58] Field of Search ............. 208/DIG. 1, 146, 108, 208/209, 213, 59, 143, 216, 254 H

[56] References Cited
UNITED STATES PATENTS

| | | | |
|---|---|---|---|
| 2,903,417 | 9/1959 | Beaugh et al. | 208/136 |
| 3,402,121 | 9/1968 | Hallman | 208/59 |
| 3,451,895 | 6/1969 | Webb | 208/DIG. 1 |
| 3,592,606 | 7/1971 | Boyd | 208/DIG. 1 |
| 3,607,091 | 9/1971 | Boyd | 208/DIG. 1 |

Primary Examiner—G. J. Crasanakis
Attorney, Agent, or Firm—G. F. Magdeburger; R. H. Davies; D. L. Hagmann

[57] ABSTRACT

A method is disclosed for obtaining an early detection and warning of a dangerous temperature excursion in a process using one or more hydrocarbon hydroprocessing reactors operating under otherwise ordinary hydroprocessing conditions. The warning is obtained by monitoring the specific gravity and/or methane content of the light gas fraction of the reactor effluent product stream. Pursuant to the warning, one or more suitable quenching means are employed to control the excursion.

14 Claims, 1 Drawing Figure

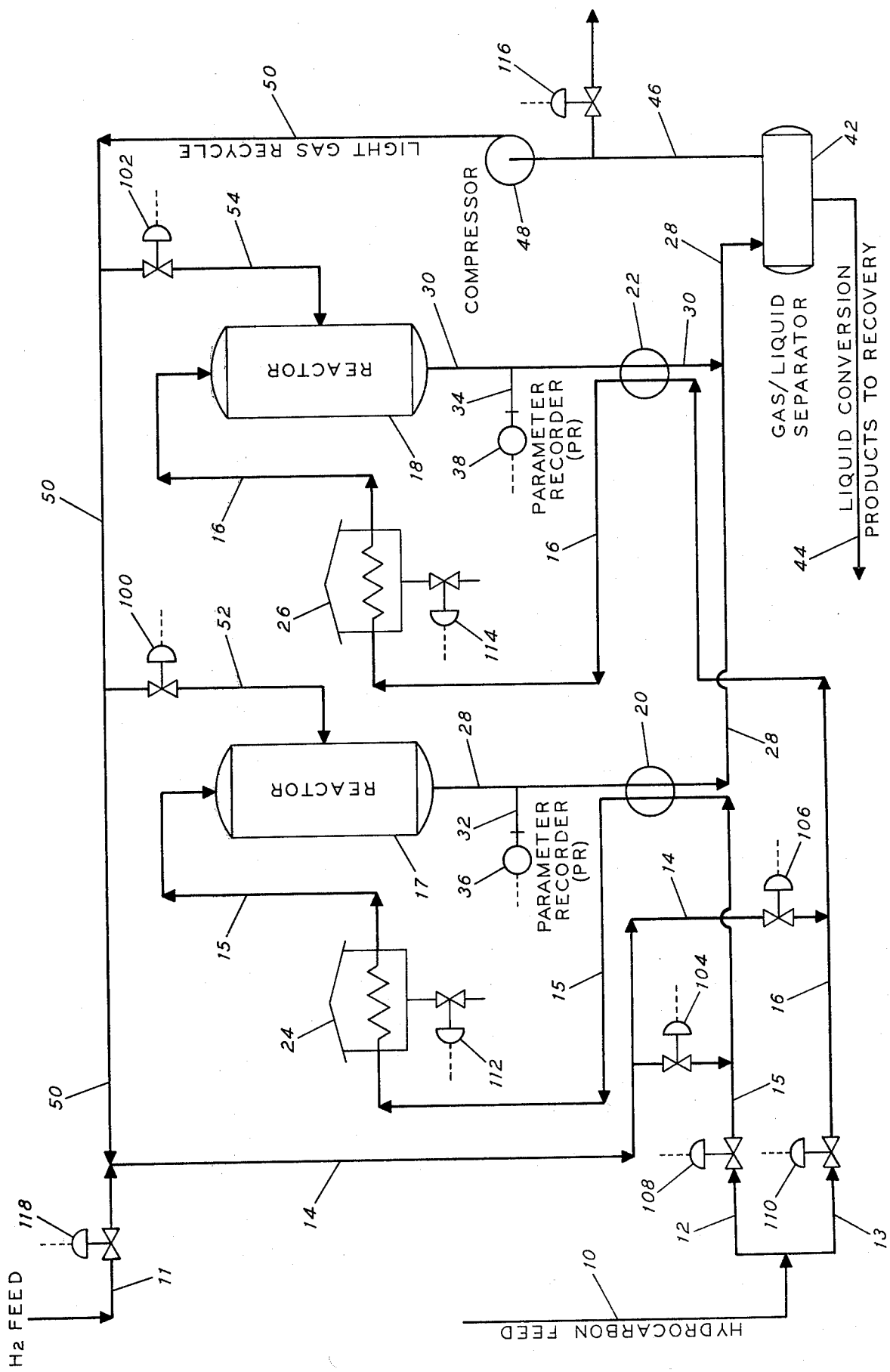

EARLY DETECTION AND WARNING METHOD FOR CONTROLLING TEMPERATURE EXCURSIONS IN HYDRO-PROCESSING HYDROCARBONS

BACKGROUND OF THE INVENTION

This invention relates to a method for detecting and obtaining an early warning of a temperature excursion in a hydrocarbon hydroprocessing reactor. More particularly, it relates to detecting a dangerous temperature excursion in a hydroprocessing reactor by monitoring a parameter of a light gas fraction of the resulting product stream and, responsive thereto, quenching the temperature excursion by one or more suitable means.

PRIOR ART

The treating of a petroleum hydrocarbon feed with hydrogen gas, usually at an elevated temperature and pressure, hydroprocessing, is well known in the petroleum process art. The object in hydroprocessing a hydrocarbon feed varies, and, in general, includes one or more of the following:
1. cracking the feed;
2. removing impurities, including nitrogen, sulfur and metal contaminants from the feed; and
3. reducing hydrocarbon unsaturation of the feed.

In general, whether as a primary objective or as an unavoidable concurrent result in hydroprocessing, an appreciable amount of exothermic cracking of the feed takes place.

Under routine or normal hydroprocessing conditions for a lined-out process, control of the process usually presents no particular problem to the operator. A mass of particulate solid, usually a hydroprocessing catalyst in the form of a fixed bed or fluid bed, a hydroprocessable hydrocarbon feed and hydrogen gas are contacted in a reaction zone. And the effluent product stream from the reactor is separated into a light gas fraction which may be recycled and a liquid hydrocarbon fraction which is recovered for use or further processing. Occasionally, however, for one or more of a variety of reasons, including unexpected subtle changes in a contact mass, in a feed stream composition and an inadvertent process control misadventure, a serious and dangerous localized temperature excursion occurs. If permitted, this local condition may build up to the point where an autogenous spread of the temperature excursion occurs in the reactor, that is a runaway temperature condition develops. The site of the excursion is, in general, in a fixed bed of a fixed-bed reactor or in a portion of a malfunctioning fluid-bed reactor in which at least a portion of the fluid bed has become stabilized and is functioning in the manner of a fixed-bed reactor. An early detection and warning at the incipiency of a temperature excursion is, therefore, a critical necessity in the effective control of a hydroprocessing process. To this end ordinary practice in such control is to place a large number of temperature-reading sensors at sites which are considered to be strategic locations. The temperature readouts of the sensors are monitored and suitable steps to control the process are taken when the readouts so indicate. This use of sensors is disadvantageous for many reasons. A temperature-reading sensor located in a reactor bed usually disrupts in some degree the flow of the process stream. And the more of these sensors used, the greater is the disruption. In view of the serious consequences of a runaway temperature excursion, the tendency is to include a large number of sensors in the reactor, but, even so, unless the number is unduly large, a significant or large local temperature increase, especially in a fixed-bed reactor, can go undetected. It is an object of this invention to provide a reliable and early means for detecting evidence of a temperature excursion and to use this evidence as a signal for initiating remedial steps calculated to effectively control the excursion without undue interruption of the process.

SUMMARY OF THE INVENTION

A method has now been found for obtaining an early detection and warning of a dangerous temperature excursion in a continuous hydrocarbon hydroprocessing process containing at least one hydroprocessing reactor operating under hydroprocessing conditions, including:
a. introducing a hydroprocessable hydrocarbon feed stream into said reactor and into contact with a contact mass contained in said reactor, said introduction being made at a suitable feed rate and temperature;
b. maintaining normal hydroprocessing temperature and pressure in said reactor; and
c. producing a reactor effluent product stream comprising a light gas fraction and a liquid hydrocarbon product fraction; which comprises:
1. continuously or periodically determining at least one parameter selected from the group consisting of methane content and relative specific gravity of said light gas fraction, said determination being made during said continuous operation; and
2. determining whether a significant or large increase has occurred in said parameter by comparing a set of said determinations.

In a further and preferred embodiment of the present invention a dangerous temperature excursion in a hydrocarbon hydroprocessing reactor which has been detected by the present method is quenched by the use of one or more ordinary quenching means.

In a yet further preferred aspect of the invention two or more fixed bed reactors, preferably from 2 to 5 reactors, are operated in the parallel mode (for example, see the Figure) and at least a portion of the light gas fraction of the reactor effluent streams is continuously recycled to the reactors.

Surprisingly a significant increase or a large increase in the relative specific gravity or methane content of the light gas fraction of the effluent stream of a hydrocarbon hydroprocessing reactor effluent product stream has been found to be a consistent and reliable indication and warning of a temperature excursion in the reactor.

By a "dangerous temperature excursion", as used herein, is meant a temperature differential as between the normal operating temperature of a bed of a fixed-bed hydroprocessing reactor and a local portion of the bed which is in the range from about 50° to 150°F (about 10° to 40°C).

By a "light gas fraction," as used herein having reference to the hydroprocessing reactor effluent product stream, is meant a normally gaseous mixture comprising hydrogen gas as a major component, and at least a trace of methane. The fraction may also contain one or more normally gaseous components usually present in a reactor effluent product stream of a hydrocarbon hydroprocessing process, including hydrogen sulfide, ammonia, hydrogen cyanide, and the like, as well as ethane, propane, and the like.

By a significant increase in the specific gravity or methane content of a light gas fraction as used herein is meant in general an increase, over an operating period of less than about one hour, in an amount in the range from about 20% to 40% or more of the differential increase in these parameters which is ordinarily experienced during a normal operating cycle of a fixed bed hydrocarbon hydroprocessing cycle. The length of such a cycle varies depending upon the particular hydroprocessing process (hydrocracking, hydrodenitrification, hydrodesulfurization and/or hydrogenation) and upon the particular fixed bed employed. The differential increase is the value of the parameter at the end-of-run less the value at start-up of the process. Where the length of run normally exceeds one year, the use of a one year base period for establishing the range is preferred and convenient.

The present method may also be used where the hydroprocessor does not have prior knowledge of the differential increase in the aforementioned parameters for the normal operating cycle. In this case an increase in the methane content or relative specific gravity of the light gas fraction, over an operating period of less than about one hour, which is at least about 20% of the normal operating value for the parameter, a large increase, is in general a satisfactory basis for the detection of a dangerous temperature excursion. Determination by detecting a significant increase in the aforementioned parameters is preferred.

By a set of parameter determinations as used herein is meant at least two of the determinations taken at different points in time and wherein the time intervals between the determinations of the set is less than about one hour. Preferably the time interval between determinations of the set is less than an amount in the range from 1 to 20 minutes.

PREFERRED EMBODIMENT

This invention is further described with reference to the attached drawing, which is a schematic flow diagram of a typical hydroprocessing process using the detection and control features of this invention. In this process a hydrocarbon feed is treated with hydrogen for the removal of sulfur under hydrodesulfurizing conditions.

Referring now to the drawing, the hydrocarbon charge stock and fresh hydrogen feed are introduced into the process via lines 10 and 11, respectively. For purposes of this example, the hydrocarbon feedstock is a sulfur-containing residuum obtained from the vacuum separation of an atmospheric distillation of a high-sulfur-content crude oil into about a 1000°F+ overhead fraction and a bottoms fraction, the residuum feedstock for the present process.

For splitting and delivery of the hydrocarbon feedstock into as many feed lines as there are process reactors employed in the process, in this instance two, line 10 is branched into two lines, 12 and 13. Via line 14 a mixture of fresh hydrogen feed and recycled light gas is introduced into and admixed with the split hydrocarbon feedstock. The resulting composite hydrocarbon-light gas mixtures are passed via lines 15 and 16 to reactors 17 and 18, respectively. In the transit of these mixtures to reactors 17 and 18, the mixtures are heated by indirect heat exchangers 20 and 22 and furnaces 24 and 26, respectively. The heated composite mixture is introduced into reactors 17 and 18 at a temperature in the range from about 600° to 900°F and at a pressure in the range from about 800 to 3000 psig, of which about 400 to 2500 psi is the hydrogen partial pressure.

Reactors 17 and 18 are hydrodesulfurizing reactors and disposed in fixed relationship in each is a bed of a suitable hydrodesulfurization catalyst. A typical such catalyst is a sulfided composite of cobalt, molybdenum, phosphate, alumina and titania, for example as described in U.S. Pat. No. 3,493,517 (J. Jaffe). The introduced feed as described above contacts and flows through the fixed-bed catalyst at a liquid hourly space velocity of about 0.25. As a result of the contacting, a substantial fraction of the sulfur-containing hydrocarbons in the feed are desulfurized. Concurrent with this desulfurization, a substantial fraction of the hydrocarbons in the feed are hydrocracked. The effluent product stream obtained by the contacting of the feed with the fixed bed is a mixture of liquid hydrocarbons, a liquid product fraction and of a gaseous mixture, a light gas fraction. This stream is withdrawn from reactors 17 and 18 via lines 28 and 30. The above description relates to normal operation of a lined-out hydrodesulfurization reactor and of itself is routine in the art in the absence of a problem relating to control of the process.

As discussed above, a dangerous temperature excursion may occur in a localized position of the fixed bed of the reactor. In the absence of a prompt and suitable response for control of the excursion, conditions are ripe for an autogenous spread of the excursion throughout the reactor. In the ordinary control mode for a hydroprocessing process, detection of the excursion is usually not made until the excursion is substantially into the autogenous stage. This is usually too late for control without an undesirable degree of upset of the required normal operating mode for the process.

Reliable and early warning of a dangerous temperature excursion in the fixed bed of reactors 17 and 18 is obtained by continuously withdrawing via lines 32 and 34 a representative sample of the effluent product streams in lines 28 and 30 and passing these samples to parameter recorders (PR units) 36 and 38. These units comprise an ordinary liquid-gas separator operating at normal liquid-gas separator conditions, and a parameter reader. The separated gas is the light gas fraction of the effluent product stream, and the balance is the liquid fraction. The light gas fraction is measured for its methane content by passing at least a representative portion of the fraction through the reader, which is a calibrated, electric-signal-generating (or a pneumatic-signal-generating), gas gravitometer coupled with a time-based recording potentiometer. The latter is located for easy reference in the control and monitoring station (not shown on the drawing) of the process. As backup for the process operator, the potentiometer may contain an electric alarm system set to sound should the current gravimetric reading exceed a preset maximum permissible increase. In the present instance a significant increase is about 0.03 units in the relative (the specific gravity of the light gas fraction is measured relative to ambient air) specific gravity of the light gas fraction. Such an increase signifies that a dangerous temperature excursion is taking place in the pertinent reactor.

Before describing the steps which are preferably taken to control a significant or large temperature excursion detected by the present method, the description of the balance of a normal operating cycle will be given. Reference is now made to the effluent product streams removed from reactors 17 and 18 via lines 28 and 30. These streams are passed respectively through heat exchangers 20 and 22 wherein they are cooled by indirect heat exchange with the composite feed mixture of the process in lines 15 or 16. The cooled effluent streams are then passed via line 28 or 30 and 28 to gas/liquid separator 42 for separation into a recyclable light gas portion and a liquid conversion product portion. The latter is withdrawn from separator 42 via line 44 for recovery, and the light gas is withdrawn for recycle or at least a part of the stream to the process via line 46, compressor 48, and line 50.

Reference is now made to the circumstance where a determination by at least one of PR units 36 and 38 indicates that a significant increase in the relative specific gravity of the corresponding light gas fraction has occured. In this event, prompt action directed to quenching the dangerous temperature excursion which is responsible for the increase must be initiated by the process operator. To this end, the valves included in the Figure are remote-control valves with the control being effected by the process operator at the process control monitoring station. The short dotted lines leading from the bonnets of the control lines are incomplete representations of the electrical (or pneumatic) control leads to these valves and which terminate at the process control console (not shown). Preferably the quenching of the dangerous excursion is effected using relatively (usually 150°–750°F below the normal reactor operating temperature) cold hydrogen gas. Such a quench is obtained by opening valves 100 and/or 102, depending upon the location of the temperature excursion, and a mixture of unheated fresh hydrogen and recycle light gas is introduced into the affected reactor(s) via lines 52 and/or 54. Hydrogen gas rapidly permeates the content of the reactor and in becoming heated quenches the reactor content moderately and without a substantial upset of the desired ongoing process. At the same time, and in order to facilitate flow of the hydrogen-rich quench stream, valves 104 and/or 106 may be partially closed. These valves normally are open for the introduction of the process feed mixture of fresh hydrogen feed and light gas recycle into the hydrocarbon feed of the process.

Secondary and backup quench, if required, for example where the significant increase is large, may be obtained by increasing the hydrocarbon feed rate to the process. Valves 108 and 110 are used to control this feed rate, and may be opened wider to permit faster flow and/or the feed pump (not shown) may be speeded up. Further backup quenching is obtained by partially reducing the fuel flow to furnaces 24 and 26. Valves 112 and 114, respectively, are used to control the furnace heating of the composite process feed. In the extreme case, these valves, of course, would be fully closed. However, the early detection and warning made possible by the present method usually permits effective quenching of a dangerous temperature excursion by taking moderate quenching action.

Yet further backup quenching action may be obtained by reducing the system pressure on the downstream side. For this purpose, valve 116, which is normaly closed, may be opened sufficiently to produce the desired reduction in the system pressure.

A still further backup or alternative quench action, especially where the hydroprocessing includes a substantial reduction of carbon-carbon unsaturation by hydrogenation, may be obtained by excluding fresh hydrogen makeup feed to the process. In this case, valve 118 is closed and valves 100 and 102 are opened as desired, permitting the introduction into the reactor(s) of a relatively cold light gas recycle stream. This stream, relative to the normal gaseous feed mixture to the process, is relatively poorer in hydrogen gas and its use also results in a diminished heat effect from the hydrogenation reaction.

PARAMETERS

The relative specific gravity and methane content of the light gas fraction vary depending upon the particular hydroprocessing process and conditions employed. In general, the relative specific gravity is in the range from about 0.17 to 0.27 units, although it may be somewhat lower or higher, the measurement being made at ambient (conditions) and the differential increase is usually about 0.10 relative specific gravity units. A significant increase is therefore in the range from about 0.02 to 0.04 relative specific gravity units. A large increase is therefore in the range 0.034 to 0.054 relative specific gravity units.

In general, the methane content of the light gas fraction is in the range from about 9 to 18.5 volume percent, although it may be somewhat lower or higher; and the differential increase is usually about 6.5–9.5 volume percent units. A significant increase in methane content is therefore in the range from about 1.3 to 3.8 volume percent units. A large increase is therefore in the range from 1.8 to 3.7 volume percent units.

PARAMETER DETERMINATIONS

The relative specific gravity and methane content parameters may be determined by any suitable analytical method capable of continuous analysis of a gas stream or which can be completed for two intermittent samples taken less than about one hour apart. As discussed in the embodiment described above, the specific gravity determination using a rotating gas gravitometer is a preferred means. Suitable and representative means for determining methane contents include the use of spectrometers, mass and absorption, of a gas-liquid chromatograph, of a calorimeter, and the like.

QUENCHING MEANS

One object in the quenching is to provide a heat sink for a rapid takeup of local exothermic reaction heat. In addition, or as a sole means for control of temperature excursions, one or more reaction rate moderating changes may be made in such functional process parameters as total pressure of the system, partial pressure of hydrogen gas, feed rates and temperatures or reactants and the like. Desirably the quenching action taken is sufficient to achieve the desired end, a return to normal or near-normal operation throughout the reactor, yet is not sufficient to substantially disrupt the ongoing process. Herein lies an especial advantage of the present early detection and warning method, The present detection method is of such sensitivity and the warning so early in the chain of events (relating to a dangerous temperature excursion) as to permit, in general, effective control by making relatively minor process adjustments. Costly operational upsets or deviations from normal optimum operating conditions of a hydroprocessing process are thus avoided. Frequently, in view of the senstivity of the present detection method, the ordinary quenching means normally employed may be cut back by as much as 20 to 60% and higher, and yet provide effective control of the temperature excursion. Depending upon whether the succeeding sets of parameter determinations are larger than, less than, or equal to zero, the quenching action is increased, abated or discontinued.

The quenching means contemplated for use in conjunction with the present detection method are in general the ordinary means known and used in the hydrocarbon hydroprocessing art (see, for example, U.S. Pat. No. 3,402,121, N. M. Hallman). Representative and suitable quenching means include:

1. introducing a relatively cold (usually in the range 150°–750°F below the normal reactor temperature) stream of hydrogen gas into said reactor;
2. reducing the hydrocarbon feed stream temperature;
3. recycling at least a portion of the light gas product fraction to the reactor(s);
4. recycling at least a portion of the liquid hydrocarbon product fraction to the reactor(s);
5. reducing the normal system pressure of the process; and
6. increasing the hydrocarbon feed stream rate.

As discussed above, the present method is a reliable means for obtaining an early warning of a temperature excursion in a hydrocarbon hydroprocessing reactor. It may be used in place of many, if not most, of an unduly large number of temperature-reading sensors otherwise required for equivalent monitoring of a hydroprocessing process reactor. The present method is especially useful in combination with a normal complement of temperature-reading sensors. In this connection, each method is a backup for the other, and if there is an unfortiuitous failure of one system, the other continues to provide information for monitoring the process. Further, where the combination is employed, the number of temperature-reading sensors may be sharply reduced relative to those otherwise required in the absence of the present method.

NORMAL HYDROPROCESSING CONDITIONS

The present process is, in general, suitable for use in controlling hydrocarbon hydroprocessing processes and such use is contemplated herein. Hydroprocessing of itself is not new herein. Hydrocarbon hydroprocessing process conditions vary depending upon the particular process and feed combinations contemplated and, in general, include (1) a hydroprocessable hydrocarbon feed, for example feeds ranging from crude oil, refinery crude oil fractions, partially refined crude oil fractions, and the like; (2) a process temperature in the range from about 400° to 1100°F (about 200° to 600°C); (3) a system pressure in the range from about 1 to 350 atmospheres; (4) a hydrogen gas partial pressure in the range from about 1 to 300 atmospheres; (5) a liquid hourly space velocity (LHSV) in the range from about 0.1 to 20; and (6) a fixed-bed or fluid-bed contact mass ranging from a substantially inert particulate mass, for example a mass composed of one or more refractory metal oxides such as silica, alumina, silica-alumina, and the like, to particulate catalytic solid composites, for example a composition comprising a solid support, or carrier, and one or more catalytically active metallic components selected from the metals and compounds of Groups VI-A and VIII of the Periodic Chart of the Atoms, i.e., a fixed-bed or fluid-bed contact mass suitable for and as ordinarily employed in the hydrocarbon hydroprocessing art.

The present method lends itself readily to adaptation to operation under computer control and such is contemplated as an alternative aspect of this invention. Because the functions involved for computer control using the present method are routine, such as the recording of physical information, taking a difference, storing and comparing the results with a preset value and the like, the preparation of a satisfactory program for computer control is also but a routine matter.

What is claimed is:

1. A method for detecting a dangerous local temperature excursion in a continuous hydrocarbon hydroprocessing process containing at least one hydroprocessing reactor, said reactor previous to said excursion having been operating under normal hydrocarbon hydroprocessing conditions, including:
   a. a hydroprocessable hydrocarbon feed stream introduction into said reactor and into contact with a particulate contact mass contained in said reactor at a suitable feed rate, said reactor being selected from the group consisting of a fixed-bed or fluid-bed reactor;
   b. a suitable hydroprocessing temperature and pressure in said reactor; and
   c. a reactor effluent product stream comprising a light gas fraction and a liquid hydrocarbon product fraction being withdrawn from said reactor; which comprises:
   1. continuously or periodically determining at least one parameter selected from the group consisting of methane content and relative specific gravity of said light gas fraction, said determinations being made during said continuous operation; and
   2. comparing a set of said determinations, thereby detecting said excursion when said methane content increases an amount in the range from about 1.3 to 1.8 volume percent units or said relative specific gravity increases an amount in the range from about 0.02 to 0.04 unit.

2. A method as in claim 1 further characterized in that said process provides a fixed-bed reactor.

3. A method as in claim 1 further characterized in that said process is a hydrodesulfurizing process and said hydrocarbon feed is a sulfur-containing residuum.

4. A method as in claim 1 further characterized in that said parameter is relative specific gravity.

5. A method as in claim 1 further characterized in that said temperature excursion is quenched by using at least one suitable ordinary quenching means.

6. A method as in claim 5 further characterized in that said quenching is carried out by introducing a relatively cold stream of hydrogen gas into the reactor containing the dangerous temperature excursion.

7. A method as in claim 5 further characterized in that said quenching is effected by introducing a relatively cold stream of hydrogen gas into said reactor and recycling at least a portion of said light gas product fraction to said reactor.

8. A process as in claim 1 further characterized in that said parameter is methane content.

9. A process as in claim 1 further characterized in that said parameter is relative specific gravity.

10. A method for detecting a dangerous local temperature excursion in a continuous hydrocarbon hydrodesulfurizing process employing at least one reactor, said reactor previous to said excursion having been operating under normal hydrocarbon hydrodesulfurizing conditions, including:
a. introducing a hydrodesulfurizable hydrocarbon feed stream selected from the group consisting of crude oil, refinery crude oil fractions, and partially refined crude oil fractions into said reactor and into contact with a particulate solid composite comprising a solid support or carrier and at least one catalytically active metallic components selected from the group consisting of metals, metal oxides and metal sulfides of Groups VIA and VIII of the periodic chart said introduction of feed being at a liquid hourly space velocity (LHSV) in a range from about 0.1 to 20, and said reactor being a fixed bed or fluid bed reactor;
b. employing a temperature in the range from about 400° to 1100°F and a system pressure in the range from about 1 to 350 atmospheres; and
c. withdrawing a reactor effluent product stream comprising a light gas fraction and a liquid hydrocarbon product fraction from said reactor, which comprises:

1. continuously or periodically determining at least one parameter selected from the group consisting of methane content and relative specific gravity of said light gas fraction, said determinations being made during continuous operation; and
2. comparing a set of said determinations, thereby detecting said excursion where said methane content increases an amount in the range from about 1.3 to 1.8 volume percent units or said relative specific gravity increases an amount in the range from about 0.02 to 0.04 unit.

11. A method as in claim 10 further characterized in that said parameter is relative specific gravity.

12. A method as in claim 10 further characterized in that said temperature excursion is quenched by using at least one suitable ordinary quenching means.

13. A method as in claim 12 further characterized in that said quenching is carried out by introducing a relatively cold stream of hydrogen gas into the reactor containing the dangerous temperature excursion.

14. A process as in claim 10 further characterized in that said parameter is methane content.

* * * * *